United States Patent
Li et al.

(10) Patent No.: US 9,736,118 B2
(45) Date of Patent: Aug. 15, 2017

(54) SESSION INITIATION PROTOCOL DENIAL OF SERVICE ATTACK THROTTLING

(71) Applicant: Cisco Technology, Inc., San Jose, CA (US)

(72) Inventors: Xin Li, Shanghai (CN); Yin Wang, Shanghai (CN); Yibin Zhang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 13/944,156

(22) Filed: Jul. 17, 2013

(65) Prior Publication Data

US 2015/0026793 A1 Jan. 22, 2015

(51) Int. Cl.
  *G06F 9/00* (2006.01)
  *H04L 29/06* (2006.01)
  *G06F 17/00* (2006.01)

(52) U.S. Cl.
  CPC ...... *H04L 63/0281* (2013.01); *H04L 63/1458* (2013.01); *H04L 65/1079* (2013.01)

(58) Field of Classification Search
  CPC . H04L 63/02; H04L 63/0281; H04L 63/1458; H04L 65/1079; H04L 63/1425; H04L 29/00
  USPC .......................................................... 726/12
  See application file for complete search history.

(56) References Cited

U.S. PATENT DOCUMENTS

| | | | |
|---|---|---|---|
| 6,725,378 B1 * | 4/2004 | Schuba | H04L 63/1408 707/999.01 |
| 7,779,021 B1 * | 8/2010 | Smith | G06F 11/3476 707/760 |
| 8,887,280 B1 * | 11/2014 | Dickinson | H04L 63/1458 726/23 |
| 2002/0101819 A1 * | 8/2002 | Goldstone | H04L 63/1458 370/229 |
| 2004/0184442 A1 * | 9/2004 | Jones | H04B 7/155 370/351 |
| 2005/0027818 A1 * | 2/2005 | Friedman | H04L 29/06 709/217 |
| 2006/0225133 A1 * | 10/2006 | Balasubramaniyan et al. | 726/22 |
| 2006/0280121 A1 * | 12/2006 | Matoba | H04L 63/1458 370/235 |
| 2008/0256632 A1 * | 10/2008 | Stockdell | H04L 63/1458 726/22 |
| 2009/0094691 A1 * | 4/2009 | Dargis | 726/11 |

(Continued)

OTHER PUBLICATIONS

Noureldien A.N, Izzeldin M. Osman, 'The SYNDEF: A method for defeating DoS/DDoS TCP SYN Flooding Attacks'. In Proceedings of the 14th Annual FIRST Computer Security Incident Handling Conference, Hawaii, U.S.A Jun. 2002.*

(Continued)

*Primary Examiner* — Gary Gracia

(57) ABSTRACT

In one implementation, the number of half open session initiation protocol (SIP) sessions per-destination (e.g., SIP device) or globally is limited by SIP application layer gateway (ALG) as a SIP DoS/DDoS countermeasure. Compared with traditional SIP DoS/DDoS countermeasures, the proposed solution is simple to implement and, thus, less likely to degrade SIP ALG performance. Moreover, this solution automatically adapts to DoS/DDoS attack arrival rate, while at the same time not degrading legal SIP traffic even if throttling is enforced for the SIP device.

19 Claims, 3 Drawing Sheets

(56) References Cited

U.S. PATENT DOCUMENTS

| | | | |
|---|---|---|---|
| 2010/0037309 A1* | 2/2010 | Dargis ............................ | 726/13 |
| 2010/0088763 A1* | 4/2010 | Yoo ..................... | H04L 63/1458 |
| | | | 726/22 |
| 2010/0111095 A1* | 5/2010 | Trossell ................ | H04L 1/1607 |
| | | | 370/402 |
| 2011/0164621 A1* | 7/2011 | Lee .................... | H04B 7/15521 |
| | | | 370/400 |
| 2012/0210007 A1* | 8/2012 | Ormazabal et al. .......... | 709/227 |
| 2012/0210416 A1* | 8/2012 | Mihelich ............. | H04L 63/0218 |
| | | | 726/11 |
| 2013/0163445 A1* | 6/2013 | Majumdar .............. | H04L 43/50 |
| | | | 370/252 |

OTHER PUBLICATIONS

DoS on Cisco IOS in the Feature SIP ALG in NAT Implementation, Oct. 12, 2012, www.condorlabs.net/?p=1222.
Example: Configuring SIP ALG DoS Attach Protection, Published Jan. 6, 2013, Juniper Networks, Inc.
Jeremy Stretch, Using uRPF at the Access Layer to Deter DDoS Attacks, Jul. 20, 2009, PacketLife.net.
The SIP ALG, Accessed Jul. 16, 2013, Chapter 15 VoIP Solutions: SIP for FortiOS 5.0, Fortinet FortiOS Handbook.

* cited by examiner

Fig. 1 Existing ALG behavior without DDoS throttling algorithm

Fig. 2 New ALG behavior with DDoS throttling algorithm

SESSION INITIATION PROTOCOL DENIAL OF SERVICE ATTACK THROTTLING

TECHNICAL FIELD

This disclosure relates in general to the field of computer networks and, more particularly, to denial of service attack throttling for session initiation protocol (SIP) communications.

BACKGROUND

Network devices are designed to interoperate with each other in networks to carry services. For audio, video, or instant messaging, the session initiation protocol (SIP) may be used. SIP is a communications protocol. SIP is standardized in RFC 3261 and defines the messages that are sent between peers to govern establishment, termination, and other essential elements of a call. SIP is used for creating, modifying, and terminating two-party or multiparty sessions.

For SIP in a network, SIP Application Layer Gateway (ALG) becomes an indispensable function of edge routers or firewall devices. These gateway devices may modify SIP messages in order for messages to penetrate behind network address translation (NAT), open pinholes on behalf of a firewall for the SIP traffic, proxy, or perform other gateway functions. To fulfill the functionalities, SIP ALG maintains some application information for each SIP session, which makes SIP ALG a possible target of denial-of-service (DoS) or distributed DoS (DDoS) attacks.

In DoS or DDoS, many SIP messages are sent in an attempt to overburden the SIP ALG or a SIP server. Considering that SIP ALG is located in the transit network, the attack volume may be much larger then that targeted at a single SIP server. Besides being able to handle attack traffic effectively, the DoS/DDoS countermeasures on SIP ALG should be as simple as possible in order not to significantly degrade performance.

Most SIP ALG implementations borrow ideas from SIP servers in order to counter DoS/DDoS attacks. SIP requests sent to a specific SIP server may be rate limited, such as with a leaky bucket algorithm. Negative response from a SIP server may be counted. Once a limit is reached, any SIP request to the SIP server is discarded. While these implementations are suitable for SIP servers, the implementations may not work well for SIP ALG. The rates for leaky bucket or negative response may vary by SIP server and the SIP ALG may not have the appropriate information to choose a suitable upper limit for the traffic throttling.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS

Taking into consideration of the unique position of SIP ALG in the network, the number of half open SIP sessions per-destination (e.g., SIP device) or globally is limited by SIP ALG as a SIP DoS/DDoS countermeasure. Compared with traditional SIP DoS/DDoS countermeasures, the proposed solution is simple to implement and, thus, less likely to degrade SIP ALG performance. Moreover, this solution automatically adapts to DoS/DDoS attack arrival rate, while at the same time not degrading legal SIP traffic even if throttling is enforced for the SIP device.

In one aspect, a gateway device of a computer network receives a session initiation protocol (SIP) request destined for a SIP device of the computer network. The SIP request is forwarded to the SIP device, and a first timer for the SIP request is started. The SIP request is designated as a new half open session when a response to the SIP request is not received from the SIP device within a first period of the first timer. A number of half open sessions, including the new half open session, for the SIP device are compared to a threshold. An oldest half open session is removed from the half open sessions when the number is greater than or greater than and equal to the threshold. Otherwise, the half open sessions are maintained.

In another aspect, logic is encoded in one or more non-transitory computer-readable media that includes code for execution and when executed by a processor is operable to perform operations. The operations include identifying, at a device hosting a session initiation protocol (SIP) application layer gateway (ALG), half open sessions for a SIP device, and limiting, at the device hosting the SIP ALG, a number of the half open sessions for the SIP device.

In yet another aspect, a processor is configured to implement a gateway for session initiation protocol (SIP) communications. A memory is configured to provide a half open session queue. The processor is configured to limit half open sessions of the SIP communications in the half open session queue.

Figure 1:
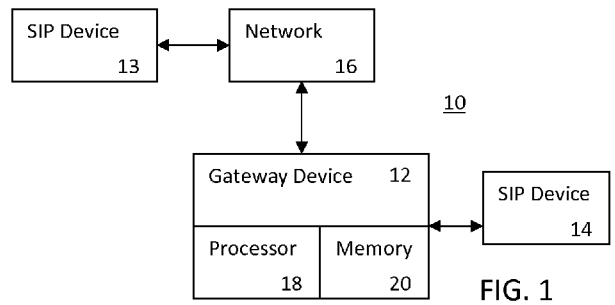
FIG. 1 is a simplified block diagram of an example network for SIP ALG-based DoS attack throttling.

FIG. 1 shows an example network 10 for SIP ALG DoS/DDoS attack throttling. The network 10 or a portion thereof is an apparatus for attack throttling. The network 10 includes various network devices, including a gateway device 12 with a processor 18 and a memory 20 and a SIP device 14. The network 10 connects with or is part of a broader network 16, which includes another SIP device 13. The SIP device 13 communicates with the SIP device 14 through the network 16. The network 16 is shown as a box, but may be many different devices connected in a local area network, wide area network, or the Internet.

The gateway device 12 acts as a gateway for a network 10 or domain. The network 10 may be for a single domain (e.g., cisco.com) or multiple domains (e.g., cisco.com and pepsi.com). For example, the network may be a wide area network, local area network, intranet, extranet, wireless local area network, virtual local area network, or combinations of networks for one or more companies. Any form of network may be provided, such as transport networks, enterprise, data center, or other wired or wireless network. The network 10 may be applicable across platforms, extensible, and/or adaptive to specific platform and/or technology requirements through link-negotiation of connectivity.

The network 10 may be relatively static, such as the same network devices 12, 14 being provided over minutes, days, weeks, or years. Network devices 12, 14 may be occasionally added or replaced. In other embodiments, the network 10 is dynamic, such as allowing network devices 12, 14 to be added or removed frequently. For example, mobile network elements may connect or disconnect from the network 10 throughout a day.

The network devices 12, 14 are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

Additional, different, or fewer components may be provided. For example, more than one network 16 may connect with the components. As another example, additional SIP devices 13 and/or 14 are provided. Additional gateway devices 12 may be provided.

The SIP devices 13, 14 are voice over Internet (VoIP) phones, conference servers, video broadcasters, personal computers, video capture or display devices, and/or audio capture or display devices. Other network devices may be used, such as a server, switch, router, gateway, bridge, hub, or repeater. One SIP device 13 is a client of the other SIP device 14, but the rolls may be reversed. The SIP devices 13, 14 communicate audio, video, or other information between each other or from one to the other pursuant to the SIP. The SIP devices 13, 14 are processing devices. Data is processed by the SIP devices 13, 14, such as serving in response to client requests, generating client requests, and/or based on programming.

The gateway device 12 is an apparatus, such as a network interface card, a top-of-rack switch, other switch, edge router, firewall, or other network device. The gateway device 12 includes the processor 18 and memory 20. The gateway device 12 is a processing device for transiting SIP communications between the SIP device 13 and SIP device 14. Communications with other network devices may also be provided. For example, the gateway device 12 handles SIP communications between any number of pairs or other groups of SIP devices.

The gateway device 12 is a processing device for performing SIP ALG or other gateway operations to transit SIP communications. For example, the gateway device 12 is a firewall server for protecting an intranet or domain. The firewall server generates a pinhole for SIP communications. As another example, the gateway device 12 is an edge router. The edge router redirects the SIP communications as appropriate for the destination within the network 10.

In one embodiment, the various ALG functions are performed by the single gateway device 12. In other embodiments, different gateway devices 12 perform different ALG functions, such as separate edge router and firewall devices. The separate devices perform attack throttling or less than all (e.g., only one) of the devices performs attack throttling for a given SIP device 14.

The memory 20 is random access memory (RAM) or other type of non-transitory, computer readable memory. Other memories within or outside the network 10 may be used instead of the memory 20 of the gateway device 12. The memory 20 stores data used in SIP ALG and attack throttling. For example, the memory 20 stores SIP request identifiers, other SIP parsing information, timers, and/or queues for SIP ALG. Example queues include a queue for active or full SIP sessions (e.g., pending queue), a queue for requests waiting for responses, and a queue for half open sessions. Example timers include timers for timing a response to an SIP request and timers for timing use of an SIP session. Different, additional, or fewer queues and/or timers may be used. ALG performs some parsing of SIP messages and stores information for SIP sessions.

The memory stores logic that includes code for execution by the processor 18. The logic is for operating the gateway device 12. The logic is used to configure the gateway device 12 (e.g., the processor 20) to perform operations. For example, the logic causes the processor 20 to configure the memory 20 to include a queue for tracking half open sessions. The size and format of the queue is established. The size of the queues may be configured by the network administrator or be a default size.

The processor 18 is configured by the logic to implement a gateway for session initiation protocol (SIP) communications. Application layer gateway (ALG) functions are performed by the processor 18. Additionally, the processor 18 implements DoS and DDoS attack throttling for the ALG. Under DoS or DDoS attack, the bottleneck on ALG is usually memory, not the CPU. Incurring additional CPU processing to throttle as part of ALG may not overburden the processor 18 even when under attack.

The throttling operates on half open sessions and not sessions operating within the SIP designated response time. The processor 18 is configured to identify half open sessions with a time of no response to any SIP message. The timing used may be the same or different depending on the type of message, the type of transport protocol, or other characteristic. To throttle, the number of half open sessions of the SIP communications in the half open session queue is limited. As a new half open session is identified, an old half open session is removed once the limit is reached. Use of the memory resources do not continue to expand.

Figure 2A:
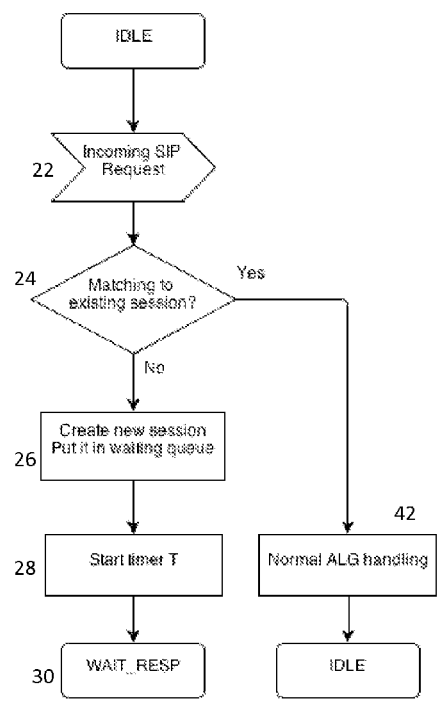
FIGS. 2A and 2B are a flow chart diagram of one embodiment of a method for SIP ALG-based DoS attack throttling.
Figure 2B:
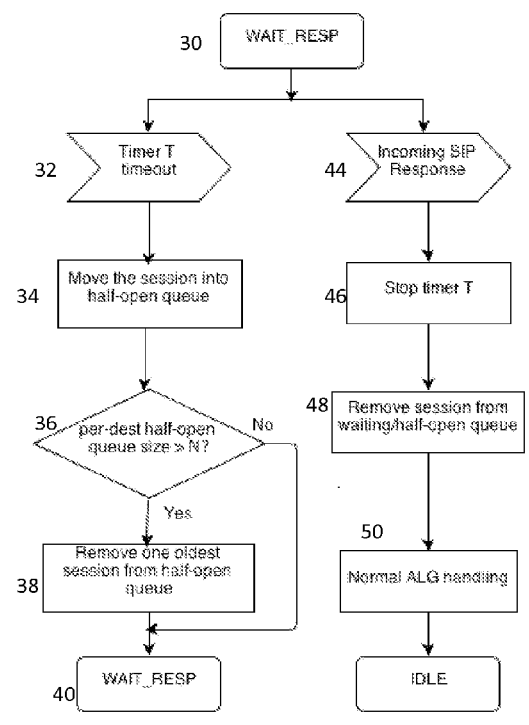

FIGS. 2A and 2B show a method for DoS and DDoS attack throttling performed as part of SIP ALG. The gateway device 12, using the processor 18 and the memory 20, performs the method. Other devices may perform one or more of the acts, such as a proxy or non-gateway device. The method is implemented by or in the network 10 of FIG. 1 or in other networks.

Additional, different, or fewer acts may be provided. For example, other acts associated with SIP are performed. In another example, other DoS or DDoS attack prevention acts are performed, such as negative response monitoring or leaky bucket algorithms in addition to throttling. The other attack prevention is performed by the gateway device 12 and/or the SIP device 13, 14.

The acts are performed in the order shown or a different order. Acts 26 and 28 are performed in the order shown, a reverse order, or simultaneously. The branches are conditional, so may be performed as needed.

In act 22, a session initiation protocol (SIP) request is received. The SIP request is from a SIP source, such as the SIP device 13. The SIP request is destined for a SIP destination, such as the SIP device 14 of the computer network 10. The SIP request is received as part of the SIP communications, such as for establishing, altering, or terminating a video and/or audio communications session.

SIP works in conjunction with other application layer protocols. Media identification and negotiation is achieved with the session description protocol (SDP). For the transmission of media streams (e.g., audio or video), SIP may use the real-time transport protocol (RTP). The SIP communications may be secured and/or encrypted, such as with the secure real-time transport protocol (SRTP) and/or with transport layer security (TLS). Other now known or later developed protocols may be used.

Exchanges between SIP devices are controlled with transactions in SIP. The transactions maintain an internal state and make use of timers. Client transactions send requests, and server transactions respond to those requests with one-or-more responses. The responses may include zero-or-more provisional responses and one or more final responses. Transactions may be categorized as either invite or non-invite requests. Invite transactions may establish a session, long-running conversation, or dialog, so include an acknowledgment (ACK) of any non-failing final response (e.g. 200 OK). Other SIP request associated messaging may include REGISTER (used to indicate a current IP address and the URLs to receive calls), CANCEL (terminates a pending request), BYE (terminates a session between two users in a conference), OPTIONS (requests information about the capabilities of a caller, without setting up a call), PRACK (provisional response acknowledgement), or other now included or later added transactions.

The SIP request is received at a gateway device of the computer network. A device implementing the ALG functions receives the request in order to provision the communications for transit through a network to the destination. The gateway device interfaces an SIP capable network to other networks. For example, the SIP request is received by an edge router and/or a firewall device.

In act 24, the gateway device determines whether the SIP request matches with an existing session. If the request matches to an existing session, the request is processed in act 42. Normal ALG handling is provided. If the request does not match an existing session, the request is processed in act 26.

In act 26, a new session is created or queued to be created. The SIP request is placed in a queue waiting for a response from the destination confirming establishment of the SIP session. As part of the ALG function, the gateway device forwards the SIP request to the SIP device within the network. The SIP request is forwarded to the appropriate destination. The SIP device is a SIP user agent or other end-point. The end-point is either the client or the server end-point. For example, the SIP device 14 is a server end-point for receiving and responding to SIP requests from the SIP device 13. A given end-point may be a server for one session and a client for another session.

In act 28, a timer is started. The timer is implemented as a hardware or software device. For example, the processor uses a clock to establish a timer. The timer is started in response to forwarding the SIP request. The gateway device starts the timer. The timer maintains a count. Alternatively, the time is started by storing a time stamp of a start time.

Normally, a response for every SIP request is received in a relatively short time. For example, as per RFC3261, a SIP server responds within 200 ms on receipt of an INVITE message. Other periods for expected response may be used, such as other periods for other types of messages.

In normal operation, such as when not subjected to a DoS or DDoS attack, the number of SIP requests handled by a gateway device for which a response has not been received in the designated time may be low, such as tens, hundreds, or fewer. During a DoS or DDoS attack, the number of SIP request that have not received a response within the designated time may be greater.

The gateway device starts the timer. The device performing the ALG functions applies the timer to separate requests between established SIP sessions and sessions that may be part of an attack. The period is used for the timer to distinguish between on-going and possible attack SIP sessions. For example, the period is set to be the time for which a response is expected (e.g., 200 ms). Other times, such as greater or less than required by the standard, may be used.

The period is defined as a default or user set configuration value. The same period is applied for all SIP requests. In other embodiments, different SIP requests have different associated periods. For example, the type of SIP request may be used to set different periods. An invite request may have a longer period and a non-invite request may have a shorter period (e.g., 300 ms and 200 ms). In yet other embodiments, the different types of transport protocols for the SIP requests have different associated periods. SIP is independent of the underlying transport layer, so an SIP request may use any now known or later developed transport layer protocol, such as transmission control protocol (TCP), user datagram protocol (UDP), or stream control transmission protocol (SCTP). The period depends on the transport protocol. For example, a SIP request running on UDP has a longer period as compared to a SIP request running on TCP.

In act 30, the process waits for the response from the SIP device. The gateway device waits for the responses for any SIP requests sent to destination devices. The amount of waiting is for about the period of the timer or less. About is used to account for processing interrupts or other processing delays in performing a timer check. Less may occur where a response is received in act 44 before the timer reaches the period or times out.

In act 32, the timer times out. The timer (e.g., count or difference from the start time) is at or at or beyond the period. The session is identified as a half open session for the corresponding SIP device. The lack of response from the SIP device is timed. When no response is received within the set period or threshold amount of time, the SIP request is designated as half open. There is a request, but no response within the period appropriate for the request. To time out, the timer stops. Alternatively, the timer continues but is noted as having exceeded the period.

The gateway hosing the SIP ALG tracks the timer for each SIP request. Any SIP session not being responded to within time T is designated as a half open session. In the event of DoS or DDoS attack, a SIP server is either overloaded so that the SIP server cannot respond within time T for incoming requests or the SIP server is enforcing a blacklist for the attack by not responding to the SIP requests from that source at all. In either case, the SIP ALG sees an increasing number of half open sessions targeted at this SIP device. This increasing number may indicate a DoS or DDoS attack against this SIP device.

In act 34, the half open session is stored in the memory of the gateway device. The incomplete session is moved into a half open queue. The queue of half open sessions stores any half open sessions. Different queues are provided for different SIP devices, but a shared queue for multiple SIP devices may be used. A general queue, such as a waiting queue, may be used. The half open session is flagged or otherwise indicated as half open.

The queue includes the SIP request, an identification of the SIP request, information parsed from the SIP request or other SIP related information. The queue also includes a designation of the SIP request as being for a half open session. Alternatively, inclusion within the queue is used as a flag for being a half open session. A priority number (e.g., first-in first out) or a time stamp for when the half open session was designated as such or from initiation of the timer may be stored.

The number of half open sessions for a given SIP device is limited. The size of the queue is restricted by limiting the number of half open sessions that are maintained in the memory of the gateway device. Since DoS and DDoS attacks are more likely to cause problems with memory capacity for SIP ALG, the amount of memory used for half open sessions or other sessions likely associated with attacks is restricted.

The limit is enforced at the gateway device hosing SIP ALG. A default or user set number of half open sessions is used for limiting. The half open session threshold N is used to throttle abnormal SIP traffic. In general, abnormal SIP traffic is small, so N depends on the tolerance for abnormal SIP traffic. Since the limit is applied to half open sessions or sessions already abnormal due to late response, only abnormal SIP traffic is affected by improper or overly restrictive selection of the value for N. N may be set based on the available resources to ALG rather than or in addition to being based on SIP traffic going through ALG.

In act 36, the number of half open sessions is compared with the threshold or limit, N. The comparison is triggered by designating a session as half open. The comparison may be of the number of half open sessions stored within the queue, including or not including the most recently designated half open session. The comparison may be of a count maintained separately from the queue. Given that there is a new half open session to be added to the queue or that has been added to the queue, the comparison is to check for being at and/or surpassing the limit, N. The threshold N is used for matching (e.g., equal to), for exceeding (e.g., greater than), or for equal to or greater than.

If the limit is not being violated (e.g., exceeded), then the half open queue is maintained as is or the newest is added to the queue and the queue is maintained. In act 40, the queue is used to await any late responses. If a late response is received, the half open session may be re-designated as a complete or full session and processed in accordance with act 44.

If the limit is exceeded and/or met, one of the half open sessions is removed from the queue in act 38. In one embodiment, an oldest half open session is removed. In other embodiments, other criteria are used to determine which of the half open sessions to remove. For every new half open session beyond the limit, a corresponding old half open session is removed. The number of half open sessions is maintained at, below, or only one or few above the threshold. Once the number of half open sessions for a destination reaches N, SIP ALG removes the oldest half open session allocated for this SIP device (e.g., SIP server). By this way, at most N attack sessions are kept by the SIP ALG, and the rate of half open session removal is in proportion to the attack arriving rate. The DoS or DDoS attacks are prevented from overloading the memory.

Removal extinguishes the SIP session. If a response is then received, the response is discarded as there is no SIP request still stored.

In act 44, a response is received within the period. The response is received by the gateway device from the SIP device. The response is to the request. Any type of response may be received, such as a transaction defined in RFC 3261 or a later added transaction. Example responses include Provisional (request received and being processed), success (the action was successfully received, understood, and accepted), redirection (further action needs to be taken, such as by the sender, to complete the request), client error (the request contains bad syntax or cannot be fulfilled at the server), server error (the server failed to fulfill an apparently valid request), or global failure (the request cannot be fulfilled at any server).

In act 46, the timer is stopped. The SIP ALG ceases timing in response to receiving the SIP response. Since the response is received prior to exceeding the period, the SIP request is processed without having been designated as a half open session. Where the response is received after such designation, the timer was previously stopped and the half open session is removed from the half open session queue.

In act 50, the full SIP session is established in response to receiving the SIP response. Normal SIP ALG processing occurs to provide for SIP communications between the SIP end points. The communications are through the gateway device, so the ALG may include routing, proxy services, a pinhole in a firewall, and/or other ALG actions. Communications are gatewayed for the SIP session based on the response. Since the limits for throttling are for half open sessions, the SIP ALG does not throttle valid, established, or full session communications. The SIP end-point may be relied on for limiting DoS or DDoS attacks for full or established SIP sessions.

In act 42, subsequent SIP requests associated with the established session are handled normally. Alternatively, each SIP request is handled independently. Any request received, even if associated with an already established session, is treated as described for FIGS. 2A and 2B. Legal SIP sessions are not affected so long as the response reaches the SIP ALG within time T.

Figure 3:
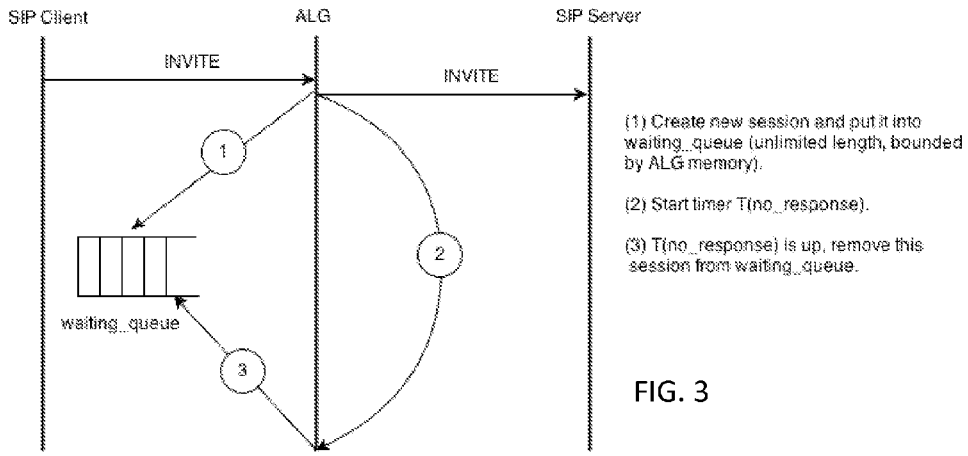
FIG. 3 is an example communications flow for session time-out tracking.

Other timers may be used for other purposes. The ALG may have a timer to clean up sessions that are not being responded to for a long time. FIG. 3 shows this timer as T(no-response). T(no-response) is a general resource reclaim mechanism not used for DDoS detection or prevention. The period for this timer is typically set such that DDoS or DoS may overload the memory. Usually this timer has a long interval value in order not to prematurely tear down normal SIP sessions, even with delayed responses.

FIG. 3 shows this response timer used for SIP ALG session management. The ALG creates a new session and places the session into a waiting queue based on having received a SIP request (e.g., invite). The waiting queue may be unlimited other than by available memory or may be restricted to a specific size. A timer is started. The timer is set to keep the waiting queue from maintaining sessions indefinitely. Any period may be used, such as 30 seconds. Given the difference purpose, the threshold time is greater than for the attack throttling. This management timing may also be applied the same regardless of the type of request and/or type of transport. This management timing may be applied to all requests, not just requests that are half open. When the time is up, the session is removed from the session queue.

Figure 4:
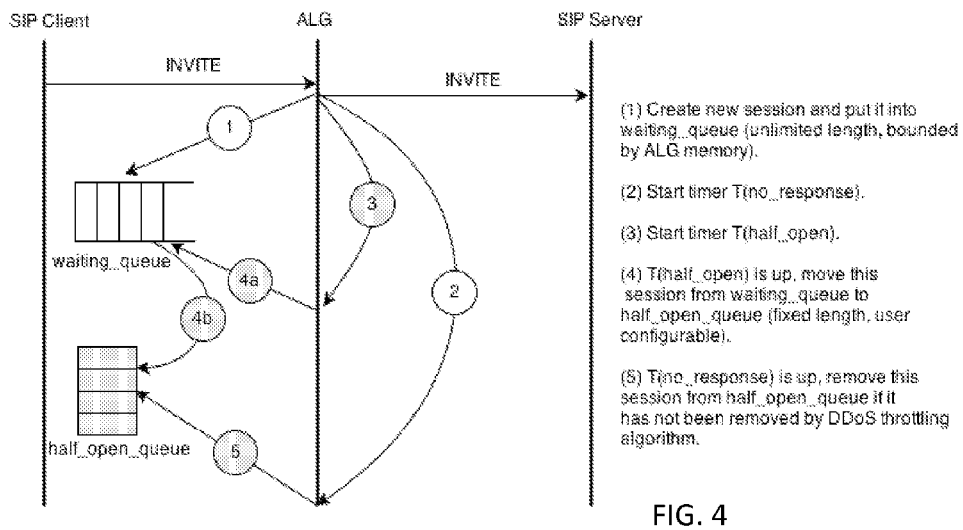
FIG. 4 is another example communications flow for session time-out tracking with additional or separate half open session time-out tracking.

FIG. 4 shows a combination timing diagram using both the waiting queue for session management and the half open queuing for attack throttling. When an SIP request is received by the ALG, the new session is created. The session is placed in the waiting queue. Two timers are started (e.g., one timer with different periods). The timer for management purposes is for a greater amount of time. The other timer for attack throttling is for a lesser amount of time, such as 200 ms instead of 30 s. If no response is received from the SIP server after the lesser period, the session is moved (e.g., change memory address or flagged in a same memory address) from the waiting queue to the half open queue. The session remains in the half open queue until replaced due to exceeding the queue limits, a response is received, or until the management timer reaches an end. For any of these events, the half open session is removed from the half open queue. During an attack, the waiting queue avoids over load by transitioning the sessions to the half open queue.

The timer for attack throttling, T(half-open), is independent of T(no-response). T(half-open) differs from T(no-response) in several aspects. T(half-open) may be protocol and/or message type specific. That is, for different transport protocol and/or SIP request type (INVITE or non-INVITE), the value of this timer varies. Due to introduction of the half open queue, the timer may be safely set to a much smaller value compared with T(no-response), such by a factor of 10 or more. By combining the protocol-specific timer with the half open queue, this algorithm may detect and throttle DDoS attacks. The half open sessions are separated from others in the waiting queue so that the half open sessions may be treated differently. T(no-response) is still used to clean up long-lived half open sessions in the half open queue where no overflow of half open sessions occurs.

In some embodiments, the throttling by the gateway device is handled by SIP destination. The number of half open sessions is separately tracked for each SIP device within the network managed by the SIP ALG. In other embodiments, a total number of half open sessions for all or a sub-set of multiple SIP devices managed by a given SIP ALG is calculated. For example, if a gateway device sends requests to two SIP devices, the number of half open sessions for both devices is totaled. A shared or separate half open session queue is used, but the sum is compared to a threshold and the oldest half open session between the multiple SIP devices is removed for throttling. In yet other embodiments, a centralized or management server sums the number of half open sessions network wide. Multiple gateway devices implement SIP ALG. The number of half open sessions from these multiple gateway devices is totaled. This total is compared to the threshold for throttling. When the total is equal to, above, or equal to or above the threshold, then the oldest half open session within the network or domain is removed.

Other DoS and DDoS attack protection for SIP ALG may be used in addition to half open session limiting. In one embodiment, the throttling using half open session limits may be part of a layered attack protection scheme. For example, half open session limiting is provided as a first or initial layer. If further protection is needed, the SIP ALG may reject any new incoming sessions. Any requests not associated with a current session are not queued and not forwarded. This is done in an effort to maintain as many existing SIP sessions and sessions not yet designated half open during an attack as possible. A highest priority is provided for existing sessions that have not been classified as half open so that legal sessions have more chances to be kept and to have short response time. Without half open classification in SIP ALG, sessions may be dropped solely based on their ages, which may not give legal sessions enough time for a response before being dropped prematurely by ALG in case of heavy DDoS attack.

Figure 5:
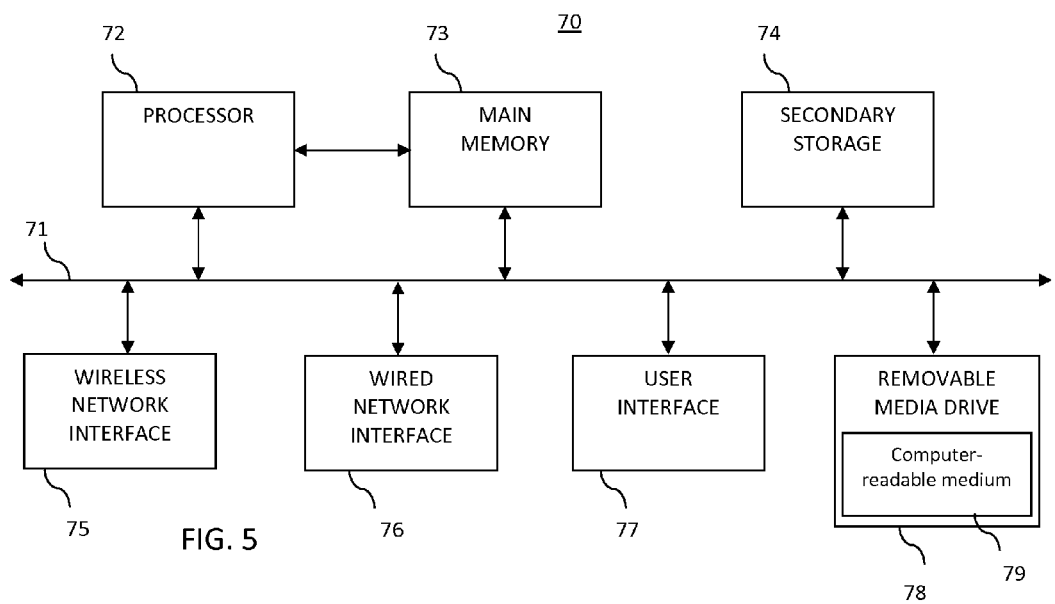
FIG. 5 is block diagram of a network device, according to one embodiment, for use in SIP attack throttling.

FIG. 5 is a simplified block diagram of an example gateway device 12, such as a firewall device, an edge router, or both a firewall and edge router device. The example network apparatus or device 70 corresponds to the gateway device 12, but other network devices may have similar or the same construction. The network device 70 includes software and/or hardware to perform any one or more of the activities or operations for attack throttling at a gateway or other device implementing SIP ALG.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of the gateway device 12. For example, the network device 70 may include another processor and/or not include the secondary storage 74 or removable media drive 78. Each gateway device 12 may include more or less components than other network devices 14.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any nonvolatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 13, 14 via one or more networks 10, 16. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
    receiving, at a gateway device of a computer network, a session initiation protocol (SIP) request destined for a SIP device of the computer network;
    forwarding, by the gateway device, the SIP request to the SIP device;
    starting, by the gateway device, a first timer for the SIP request;
    after a first period of the first timer, designating, by the gateway device, the SIP request as a new half open session and moving, from a first queue, the SIP request as the new half open session into a half open session queue when a response to the SIP request is not received from the SIP device within the first period of the first timer;
    monitoring, by the gateway device after the first period, for responses to the half open sessions, including the response to the new half open session, in the half open session queue;
    comparing, by the gateway device, a number of half open sessions in the half open session queue, including the new half open session, for the SIP device to a threshold;
    removing, by the gateway device during a denial of service attack, an oldest half open session from the half open sessions when the number is greater than or greater than or equal to the threshold, and otherwise maintaining the half open sessions;
    re-designating, by the gateway device, the new half open session as a full SIP session when the response to the SIP request is received after the first period; and
    rejecting subsequent SIP requests during the denial of service attack;
    wherein existing SIP sessions are maintained during the denial of service attack.

2. The method of claim 1 wherein receiving comprises receiving the SIP request at a firewall device or edge router of the computer network, wherein starting the first timer comprises starting the first timer at the firewall device or edge router, and wherein designating comprises storing the new half open session in a memory of the firewall device or edge router.

3. The method of claim 1 wherein receiving, forwarding, designating, comparing, and removing are performed as part of an application layer gateway (ALG).

4. The method of claim 1 further comprising:
    receiving the response to the SIP request from the SIP device;
    ceasing the timer in response to receiving the response when the SIP request is not yet designated at the new half open session or removing the new half open session from the half open sessions when the SIP request is designated as the new half open session; and
    establishing the full SIP session through the gateway device with the SIP device in response to receiving the response.

5. The method of claim 1 further comprising:
    starting a second timer for the SIP request; and
    removing the new half open session from the half open sessions when the second timer exceeds a second period, the second period longer than the first period.

6. The method of claim 1 further comprising:
    setting the first period to a length of time as a function of a type of SIP request of the SIP request.

7. The method of claim 1 further comprising:
    setting the first period to a length of time as a function of a type of transport protocol for the SIP request.

8. The method of claim 1 wherein comparing and removing comprises limiting the number of half open sessions maintained in a memory of the gateway device without limiting SIP sessions.

9. The method of claim 1 further comprising:
    setting the number based on user input of the number.

10. The method of claim 1 further comprising:
    performing, by the gateway device, the receiving, forwarding, starting, designating, comparing, and removing for another SIP device;
    comparing a sum of (a) the numbers of half open sessions for the SIP device plus (b) a number of half open sessions for the other SIP device to a global threshold; and removing the oldest half open session when the sum is greater than or greater than or equal to the global threshold.

11. Logic encoded in one or more non-transitory computer-readable media that includes code for execution and when executed by a processor is operable to perform operations comprising:
receiving, at a gateway device hosting a session initiation protocol (SIP) application layer gateway (ALG), SIP requests destined for a SIP device of a computer network;
identifying, at the gateway device, half open sessions for the SIP requests for the SIP device, the identifying the half open sessions occurring after a SIP designated response time and moving, from a first queue, the half open sessions into a half open session queue;
monitoring, by the gateway device after the SIP designated response time, for responses to the half open sessions in the half open session queue;
re-identifying, at the gateway device, at least one of the half open sessions in the half open session queue as a complete SIP session, the re-identifying being after the SIP designated response time for that at least one half open session;
limiting, at the gateway device hosting the SIP ALG and during a denial of service attack, a number of the half open sessions after identifying for the SIP device; and
rejecting subsequent SIP requests during the denial of service attack;
wherein existing SIP sessions are maintained during the denial of service attack.

12. The logic of claim 11 wherein identifying comprises timing a lack of response by the SIP device to an SIP request and designating the SIP request as one of the half open sessions when the lack of response reaches the SIP designated response time.

13. The logic of claim 12 wherein identifying comprises setting the SIP designated response time as a function of a type of the SIP request.

14. The logic of claim 12 wherein identifying comprises setting the SIP designated response time as a function of a type of transport protocol of the SIP request.

15. The logic of claim 11 wherein limiting comprises removing an oldest of the half open sessions from a queue when the number is exceeded.

16. The logic of claim 11 wherein identifying comprises timing first response to a SIP request;
further comprising:
timing second responses by the SIP device for SIP events, including the SIP request, separately from timing for identifying the half open sessions, the timing of the second responses for the SIP events being greater than the timing for identifying.

17. The logic of claim 11 further comprising:
receiving a response to an SIP request and performing the re-designating in response to the response; and
passing communications for the complete SIP session based on the response;
wherein identifying and limiting are performed for an SIP request without receiving any response and not for the SIP session.

18. An apparatus comprising:
a processor for performing operations to implement a gateway for session initiation protocol (SIP) communications; and
a memory configured to provide a half open session queue and a SIP new session queue;
wherein the processor receives SIP requests destined for a SIP device of a computer network, configured to move the SIP requests from the SIP new session queue to the half open session queue after a clocked period expires, monitors for responses to the SIP requests in the half open session queue, moves at least one of the SIP requests from the half open session queue as a full session in response to an SIP response to the at least one of the SIP requests received after the clocked period expires, limits, during a denial of service attack, a number of half open sessions of the SIP communications in the half open session queue with comparison of the number to a number of half open sessions threshold, and rejects subsequent SIP requests during the denial of service attack, wherein existing SIP sessions are maintained during the denial of service attack.

19. The apparatus of claim 18 wherein the processor and memory are in a firewall or edge router device, the operation to implement the gateway for the SIP communications is as an application layer gateway, and the processor identifies half open sessions with a time of no response, the time being different based on a type of transport protocol.

* * * * *